(12) United States Patent
Shimizu et al.

(10) Patent No.: US 8,931,988 B2
(45) Date of Patent: Jan. 13, 2015

(54) SCREW GROMMET

(75) Inventors: Toshiaki Shimizu, Yokohama (JP); Takeshi Okada, Yokohama (JP)

(73) Assignee: Nifco Inc., Yokohama-shi, Kanagawa (JP)

( * ) Notice: Subject to any disclaimer, the term of this patent is extended or adjusted under 35 U.S.C. 154(b) by 595 days.

(21) Appl. No.: 12/736,219

(22) PCT Filed: Mar. 19, 2009

(86) PCT No.: PCT/JP2009/055446
§ 371 (c)(1),
(2), (4) Date: Nov. 12, 2010

(87) PCT Pub. No.: WO2009/119446
PCT Pub. Date: Oct. 1, 2009

(65) Prior Publication Data
US 2011/0091301 A1   Apr. 21, 2011

(30) Foreign Application Priority Data
Mar. 24, 2008   (JP) .................................. 2008-075268

(51) Int. Cl.
*F16B 13/06* (2006.01)
*F16B 37/04* (2006.01)
*F16B 13/12* (2006.01)
*F16B 5/06* (2006.01)
*F16B 43/00* (2006.01)

(52) U.S. Cl.
CPC ............. *F16B 37/043* (2013.01); *F16B 13/124* (2013.01); *F16B 5/0642* (2013.01); *F16B 43/001* (2013.01)
USPC .......................................... 411/55; 411/57.1

(58) Field of Classification Search
USPC ........ 411/55, 57.1, 60.2, 80.1, 80.5, 182, 301
See application file for complete search history.

(56) References Cited

U.S. PATENT DOCUMENTS

| | | | | | |
|---|---|---|---|---|---|
| 1,051,444 | A | * | 1/1913 | Pleister | 411/80.5 |
| 1,248,004 | A | * | 11/1917 | Pleister | 411/80.5 |
| 1,248,008 | A | * | 11/1917 | Pleister | 411/80.5 |
| 1,248,009 | A | * | 11/1917 | Pleister | 411/80.5 |
| 1,751,818 | A | * | 3/1930 | Karitzky | 411/80.5 |
| 1,754,333 | A | * | 4/1930 | Pleister et al. | 411/80.5 |
| 3,171,321 | A | * | 3/1965 | Fischer | 411/80.5 |
| 4,082,030 | A | * | 4/1978 | Erickson | 411/15 |
| 4,233,881 | A | * | 11/1980 | Carrier | 411/50 |
| 4,240,323 | A | * | 12/1980 | Kojima | 411/15 |
| 4,293,260 | A | * | 10/1981 | Kojima et al. | 411/44 |
| 4,579,492 | A | | 4/1986 | Kazino et al. | |

(Continued)

FOREIGN PATENT DOCUMENTS

| JP | 106312 C1 | 6/1934 |
|---|---|---|
| JP | S50-131463 U | 10/1975 |

(Continued)

*Primary Examiner* — Flemming Saether
(74) *Attorney, Agent, or Firm* — Manabu Kanesaka

(57) ABSTRACT

A plastic screw grommet includes a head portion provided with a screwing hole for a tapping screw, and a leg portion expanded or prevented from deflecting by screwing the tapping screw. A hole diameter of the screwing hole is made smaller than an outer diameter of the above-mentioned tapping screw and larger than a root diameter of the tapping screw. Also, a projecting portion for filling a screw groove of the tapping screw to be screwed is formed in an inner face of the screwing hole.

9 Claims, 4 Drawing Sheets

(56) References Cited

U.S. PATENT DOCUMENTS

| | | | |
|---|---|---|---|
| 4,601,625 A | 7/1986 | Ernst et al. | |
| 4,743,152 A * | 5/1988 | Nakayama et al. | 411/182 |
| 4,948,314 A * | 8/1990 | Kurosaki | 411/182 |
| 5,294,225 A * | 3/1994 | Kazino et al. | 411/182 |
| 5,340,257 A * | 8/1994 | Morassutti | 411/512 |
| 5,603,593 A * | 2/1997 | Fischer et al. | 411/55 |
| 6,158,934 A * | 12/2000 | Wieland | 411/80.1 |
| 6,315,510 B1 * | 11/2001 | Sturies et al. | 411/182 |
| 7,001,124 B2 * | 2/2006 | Panasik et al. | 411/30 |
| 7,008,159 B2 * | 3/2006 | Dendo | 411/182 |
| 7,517,182 B2 * | 4/2009 | Cabrele | 411/80.5 |
| 2004/0202522 A1 * | 10/2004 | Cabrele | 411/80.1 |

FOREIGN PATENT DOCUMENTS

| | | |
|---|---|---|
| JP | H03-43107 U | 4/1991 |
| JP | H06-028318 U | 4/1994 |
| JP | H07-259824 A | 10/1995 |
| JP | H10-510033 A | 9/1998 |
| JP | 2002-213417 A | 7/2002 |

* cited by examiner

SCREW GROMMET

FIELD OF TECHNOLOGY

This invention relates to an improvement of a screw grommet with a type of fixing a fixing object by sandwiching the fixing object between a leg portion and a head portion such that the leg portion is expanded or prevented from deflecting by screwing a tapping screw (also called Tappin screw) thereinto from a state wherein the leg portion is inserted into an attachment hole provided in the fixing object.

BACKGROUND ART

In a case where panels constituting an automobile and the like are fixed to each other, there is a case wherein watertightness and the like are required for a fixing portion by a screw grommet. In this case, the sealing between the attachment hole formed in the panel and the like and the screw grommet, and the sealing between the screw grommet and a screw which is screwed thereinto, are required. In such case, conventionally, a washer-like body with elasticity on a lower face side of a flange of the screw grommet was disposed, and also the washer-like body with the elasticity on a lower face side of a head of the screw was disposed.

Incidentally, as a screw grommet wherein an opening of a screwing hole of screw means is covered by a hot-melt material, there is a screw grommet shown in Patent Document 1. Also, as a screw grommet with a structure comprising a seal washer on a lower face of the flange, there is a screw grommet shown in Patent Document 2.

Patent Document 1: Japanese Unexamined Patent Publication No. S58-24646

Patent Document 2: Japanese Utility Model Publication No. H06-24220

DISCLOSURE OF THE INVENTION

Problems to be Solved by the Invention

A main object to be solved by the present invention is that in this kind of screw grommet, a tapping screw and a screwing hole thereof in the screw grommet can be reliably sealed without providing a separate seal member therebetween.

Means for Solving the Problems

In order to achieve the above-mentioned object, in the present invention, a screw grommet is a plastic screw grommet provided with a head portion comprising a screwing hole for a tapping screw, and a leg portion expanded or prevented from deflecting by screwing the tapping screw. A hole diameter of the screwing hole is made smaller than an outer diameter of the above-mentioned tapping screw and larger than a root diameter of the tapping screw. Also, a projecting portion for filling a screw groove of the tapping screw to be screwed is formed in an inner face of the screwing hole.

In such screw grommet, the leg portion is passed through, or fitted into an attachment hole for a fixing object wherein an attachment hole with a size passing through the leg portion but not the head portion thereof is provided. Next, the tapping screw is screwed from the screwing hole of the head portion, so that the screw grommet is fixed to the fixing object such that the fixing object is sandwiched between such head portion and the leg portion expanded or prevented from deflecting. Since the screwing hole has the hole diameter with an intermediate size between the outer diameter and the root diameter of the tapping screw, an excessive force is not required for such screwing. Accordingly, under a circumstance wherein a liquid such as water and the like is entered between the screwed tapping screw and the screwing hole, a screw groove of such tapping screw can be a flow channel for such liquid. However, in a formation position of the above-mentioned projecting portion, this projecting portion fills the screw groove watertight, so that the further entry of the liquid from this formation position can be prevented.

If the above-mentioned projecting portion is formed so as to form a rib shape continuing along a hole axis of the screwing hole, or if such projecting portion is formed so as to continue in a circumferential direction of the screwing hole, the screw groove of the tapping screw to be screwed inside the head portion can be reliably filled by the above-mentioned projecting portion at any position of a helix thereof.

The above-mentioned head portion may include a flange-like portion as the center of the screwing hole, and also at least one portion of the projecting portion may be formed in an inner face of the screwing hole in this flange-like portion. In this case, further, the flange-like portion may be provided with a thickness of a size for one pitch portion or above of the tapping screw to be screwed. Since the rigidity of the flange-like portion increases, by doing this, the above-mentioned projecting portion can be firmly and reliably filled by screwing the tapping screw to be screwed into the screw groove in the inner side of this flange-like portion.

In a cross-sectional surface perpendicular to the hole axis of the screwing hole, the projecting portion may be formed such that both a top portion and a bottom portion of the projecting portion form a curve. By doing this, at the time of the screwing of the tapping screw, the projecting portion is damaged by a thread of the screw. However, at this time, the projecting portion can be prevented from being fractured and scraped from the inner face of the screwing hole. Also, in a range without causing a problem for the screwing of the tapping screw, a thickness amount of the projecting portion can be increased.

Also, such projecting portion may be projected from the inner face of the screwing hole so that the projecting portion is entered into the inside of an imaginary circle within a range of 0.1 mm to 0.2 mm rather than an arc of the imaginary circle wherein the root diameter of the tapping screw to be screwed is a diameter. In such case, the above-mentioned screwing of the tapping screw can be carried out smoothly, and also the tapping screw and the screwing hole can be reliably sealed.

Effect of the Invention

According to such screw grommet of the present invention, the screw groove of the tapping screw can be filled by the projecting portion formed in the inner face of the screwing hole of the tapping screw, so that the tapping screw and the screwing hole in the screw grommet can be reliably sealed without providing a separate seal member therebetween.

BEST MODES OF CARRYING OUT THE INVENTION

Hereinafter, best modes of the present invention will be explained with reference to FIGS. 1 to 8.

Figure 1:
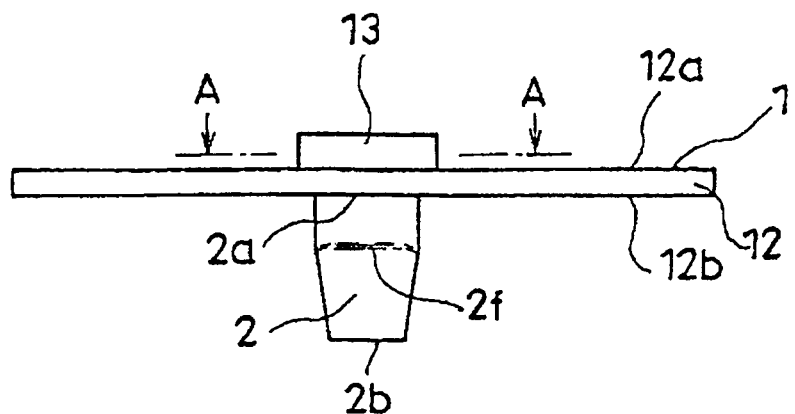
FIG. 1 is a side view of a screw grommet.
Figure 2:
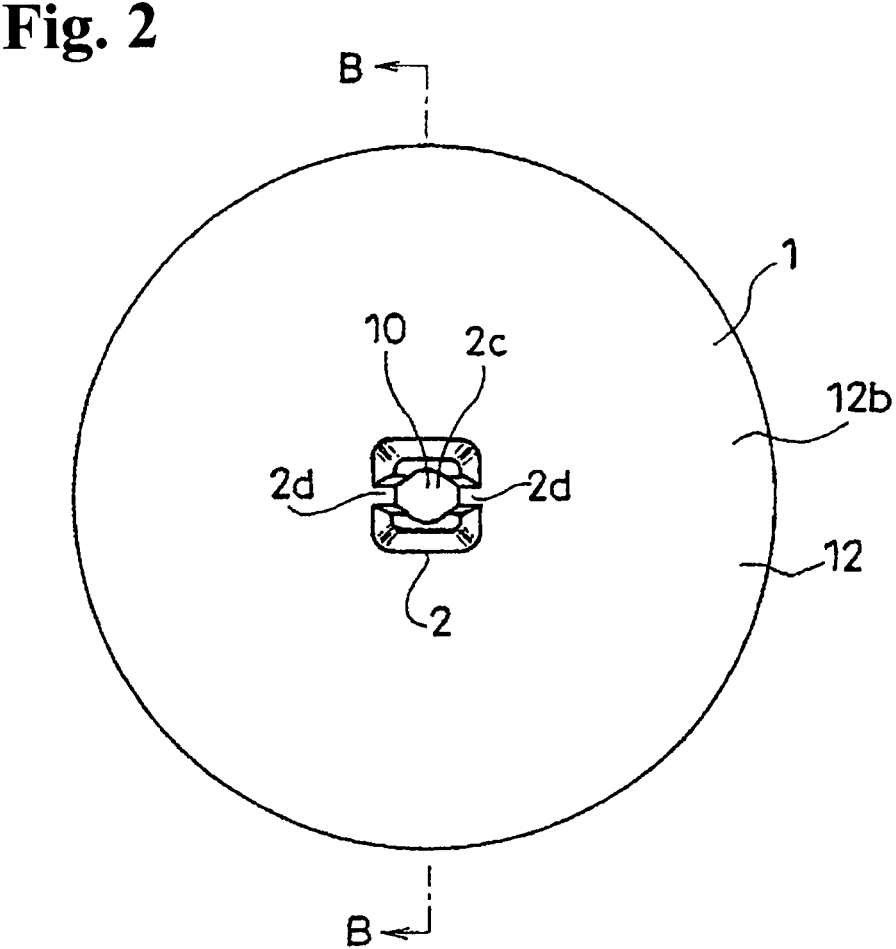
FIG. 2 is a bottom view of the above.
Figure 3:
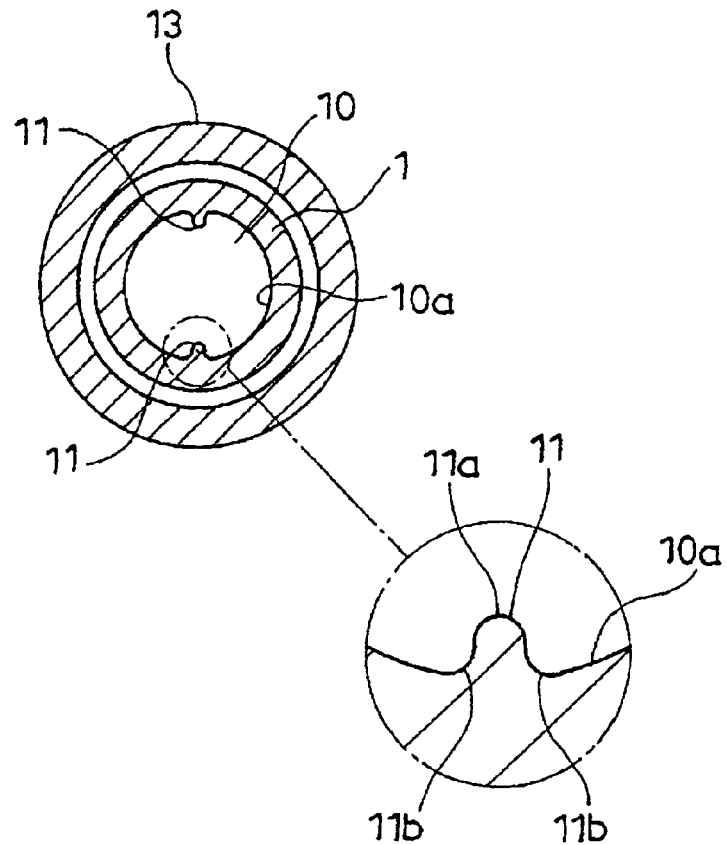
FIG. 3 is a sectional view taken along line A-A in FIG. 1.
Figure 4:
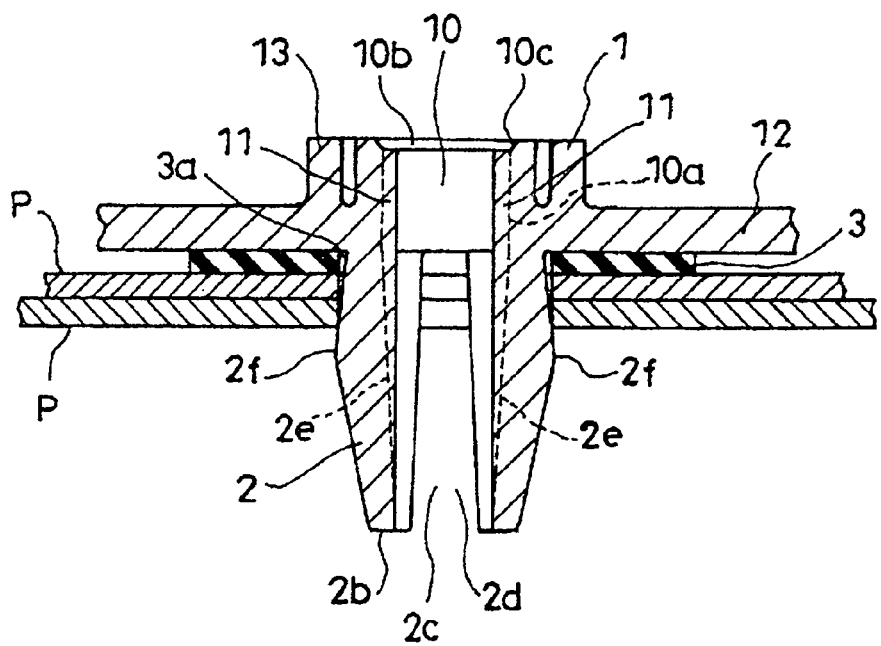
FIG. 4 is a cross sectional view showing a temporary attached state of the screw grommet in a position of line B-B in FIG. 2.
Figure 5:
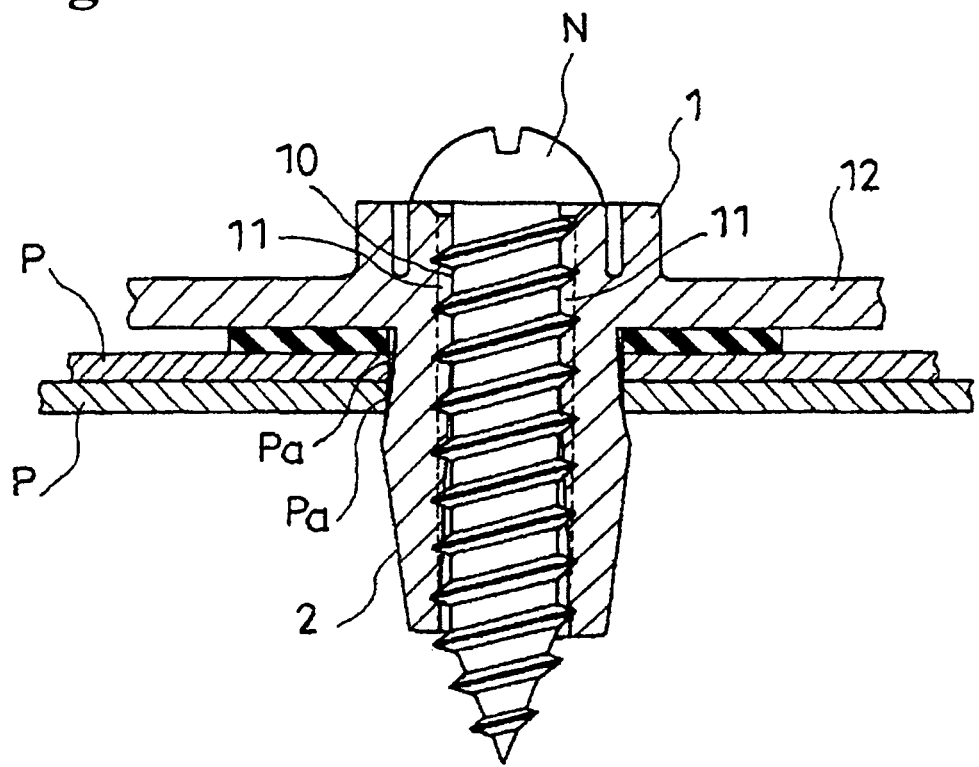
FIG. 5 is a cross sectional view showing an actually attached state of the screw grommet.
Figure 6:
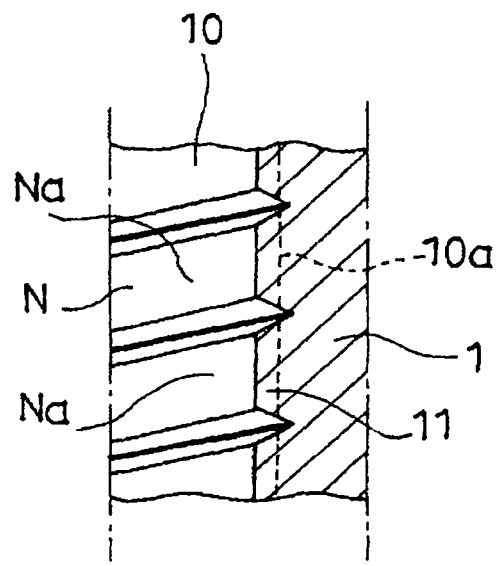
FIG. 6 is an enlarged view of essential parts of FIG. 5.

Incidentally, here, FIGS. 1 to 3 respectively show one example of a screw grommet structured by applying the present invention. FIG. 4 shows a condition wherein such screw grommet is temporarily attached to fixing objects P, FIG. 5 shows a condition wherein the screw grommet is actually attached to the fixing objects P by screwing a tapping screw N into the screw grommet from a state of FIG. 4, and FIG. 6 shows a state inside a screwing hole 10 in FIG. 5, in enlarged states, respectively. Also, FIGS. 7 and 8 respectively show how to form a projecting portion 11 formed in an inner face 10a of the screwing hole 10, and show essential parts of modified examples which differ from the example shown in FIGS. 1 to 6.

The screw grommet according to this embodiment is a type which fixes the fixing objects P by sandwiching the fixing objects P between a leg portion 2 and a head portion 1 such that the leg portion 2 is expanded or prevented from deflecting by screwing the tapping screw N from a state wherein the leg portion 2 is inserted into attachment holes Pa provided in the fixing objects P.

Such screw grommet comprises the head portion 1 and the leg portion 2. Such screw grommet is constituted by a plastic material so as to allow the above-mentioned leg portion 2 to be expanded by screwing the above-mentioned tapping screw N, and also enable the leg portion 2 to be fitted into the above-mentioned attachment holes Pa while being elastically deformed prior to such screwing of the tapping screw N.

The head portion 1 is constituted with a size so as not to enable it to be inserted into the attachment holes Pa of the fixing objects P such as a panel and the like. The leg portion 2 is integrated with the head portion 1, and constituted with a thickness so as to enable it to be inserted into such attachment holes Pa.

The screwing hole 10 of the tapping screw N is formed in the head portion 1 in a penetrating state. A hole diameter of this screwing hole 10 is constituted so as to be smaller than an outer diameter of the tapping screw N to be screwed and larger than a root diameter of the tapping screw N. For example, in a case where the tapping screw N to be screwed is a type 4 Tappin screw with a nominal diameter 6 specified by Japanese Industrial Standards (JIS), the outer diameter thereof is approximately 5.9 (5.85 to 6.0) mm, and the root diameter thereof is approximately 4.4 mm to 4.6 mm, so that the hole diameter of the screwing hole 10 is set in, for example, around 5.5 mm.

The leg portion 2 is constituted so as to have a leg inner side space 2c which is communicated with the screwing hole 10 formed in the head portion 1 from basal portions 2a which are connected to the head portion 1 toward ends 2b. Typically, such leg portion 2 is constituted so as to divide a tubular body, formed such that one end of a tube is communicated with the above-mentioned screwing hole 10 and integrally connected to one face side of the head portion 1, into two or above portions by dividing grooves 2d which continue toward one end side of the tube from the other end of the tube. In an illustrated example, such leg portion 2 is constituted so as to be expanded by gradually deflecting the two or above leg portions 2 to the outside as a size of the insertion of the above-mentioned tapping screw N into the leg inner side space 2c increases.

In this embodiment, the projecting portion 11 filling a screw groove Na of the tapping screw N to be screwed is formed in the inner face 10a of the above-mentioned screwing hole 10. Concretely, in this embodiment, the projecting portion 11 is formed from the inner face 10a of the screwing hole 10 with a hole diameter with an intermediate size between the outer diameter and the root diameter of the tapping screw N to be screwed so as not to cause a problem for the screwing of this tapping screw N, and also so as to have a projecting size which fills watertight the screw groove Na of the tapping screw N in a formation position of the projecting portion 11.

In such screw grommet, the leg portion 2 is passed through the attachment holes Pa from a state wherein the fixing objects P, wherein the attachment holes Pa with a size passing through the leg portion 2 but not the head portion 1 thereof is provided, typically, two or above sheets of panels P comprising such attachment holes Pa, are overlaid so that the respective attachment holes Pa are communicated. (FIG. 4) Next, the tapping screw N is screwed from the screwing hole 10 of the head portion 1, so that the fixing objects P are fixed so as to be sandwiched between such head portion 1 and the expanded leg portion 2. (FIG. 5) Since the screwing hole 10 has the hole diameter with the intermediate size between the outer diameter and the root diameter of the tapping screw N, an excessive force is not required for such screwing. Accordingly, under a circumstance wherein a liquid such as water and the like is entered between the screwed tapping screw N and the screwing hole 10, the screw groove Na of such tapping screw N can be a flow channel for such liquid. However, in the formation position of the above-mentioned projecting portion 11, the projecting portion 11 fills the screw groove Na watertight, so that the further entry of the liquid from the formation position can be prevented. Specifically, according to such screw grommet, without using a separate waterproof means between the screwing hole 10 and the tapping screw N, typically, a ring-like seal member which functions so as to become a seat of a head of the tapping screw N through an axis of the tapping screw N, the tapping screw N and the screwing hole 10 can be sealed watertight.

In the illustrated example, the head portion 1 includes a flange-like portion 12 as the center of the screwing hole 10. Such flange-like portion 12 is constituted so as to form a discoid. On one face 12a side of the flange-like portion 12, a short-sized tubular portion 13 whose inside is the screwing hole 10 is provided such that one end of the tube is projected so as to be integrally connected to one face 12a of this flange-like portion 12. On the other end of the tube of this short-sized tubular portion 13, the screwing hole 10 expands the diameter. A face positioned in a hole axis direction of the screwing hole 10 in an expanded diameter portion 10b becomes an introduction guiding face 10c of the tapping screw N which gradually slants in a direction narrowing the diameter of this expanded diameter portion 10b as going toward one end side of the tube of the short-sized tubular portion 13.

Also, in the illustrated example, the leg portion 2 is constituted such that one end of the tube is integrally connected to the other face 12b of the flange-like portion 12 so that a space inside the tube is communicated with the screwing hole 10, and also such that the other end of the tube is open and has an outside shape of an angular tube shape. An outline shape of such leg portion 2 copies a hole shape of the attachment holes Pa of the fixing objects P, so that at the time of screwing the tapping screw N, a screw grommet side does not rotate together. Inside the leg portion 2, arc-like inner faces 2e, which are continued to the inner face 10a of the circular screwing hole 10, are formed from the basal portions 2a thereof toward the ends 2b. The inner faces 2e of such leg portion 2 are positioned on arcs of an imaginary circle in a cross-sectional surface perpendicular to a roughly projecting direction of the leg portion 2. The inner diameter forming the inner faces 2e of the leg portion 2 gradually decreases as going toward the ends 2b from the basal portions 2a of the leg portion 2.

In the illustrated figure, such leg portion 2 is divided into two by the dividing grooves 2d which continue from the ends 2b thereof to the basal portions 2a. Concretely, roughly the center of both side faces which are in a back-to-back direction of the leg portion 2 whose outer side is the angular tube shape, is respectively divided into two by the above-mentioned dividing grooves 2d. By such dividing grooves 2d of two portions, the leg portion 2 is divided into two. Also, such leg portion 2 is constituted such that the outside thereof gradually increases toward approximately middle positions 2f in a tube axis direction from the basal portions 2a thereof, and that the outside thereof gradually narrows toward the ends 2b thereof from the approximately middle positions 2f. Also, a thickness of the approximately middle positions 2f is made slightly larger than a hole width of the above-mentioned attachment holes Pa. Thereby, in the illustrated example, by inserting the leg portion 2 into the attachment holes Pa of the fixing objects P, after, the leg portion 2 is elastically deformed inwardly once, the leg portion 2 is allowed to elastically return at a position wherein the above-mentioned approximately middle positions 2f are slipped out of a hole margin on an inserting end side of the attachment holes Pa, so that the leg portion 2 can be temporarily attached to the attachment holes Pa. (FIG. 4)

Also, in the illustrated example, the above-mentioned projecting portion 11 is respectively formed on both sides in a diametrical direction of the screwing hole 10. The respective projecting portion 11 is constituted so as to form a rib shape continuing along a hole axis of the screwing hole 10, and continues starting from an inner end of the expanded diameter portion 10b of the short-sized tubular portion 13 of the head portion 1 up to the ends 2b of the leg portion 2. As mentioned above, since the inside of the leg portion 2 is constituted so as to be gradually narrowed as going toward the ends 2b thereof, such projecting portion 11 is relatively gradually lowered as going toward the ends 2b of the leg portion 2. Then, the projecting portion 11 reaches to the point continued to the inner faces 2e of the leg portion 2 on the ends 2b of the leg portion 2. Thereby, the screw groove Na of the tapping screw N to be screwed inside the head portion 1 can be reliably filled by the above-mentioned projecting portion 11 at any position of a helix thereof. In the illustrated example, due to such structure, at least one portion of such projecting portion 11 is formed in the inner face 10a of the screwing hole 10 in the above-mentioned flange-like portion 12. Also, this flange-like portion 12 is provided with a thickness of a size for one pitch portion or above of the tapping screw N to be screwed. Since the rigidity of the flange-like portion 12 increases, by doing this, the above-mentioned projecting portion 11 can be firmly and reliably filled by screwing the tapping screw N to be screwed into the screw groove Na in the inner side of this flange-like portion 12.

Figure 7:
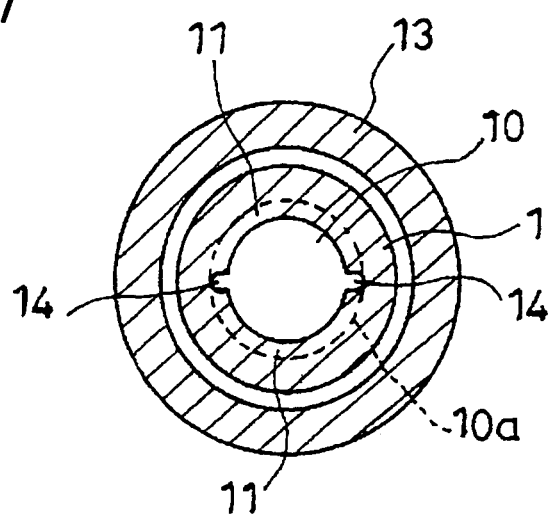
FIG. 7 is a cross sectional view of essential parts of one example wherein one portion of the structure of the screw grommet shown in FIGS. 1 to 6 is changed.
Figure 8:
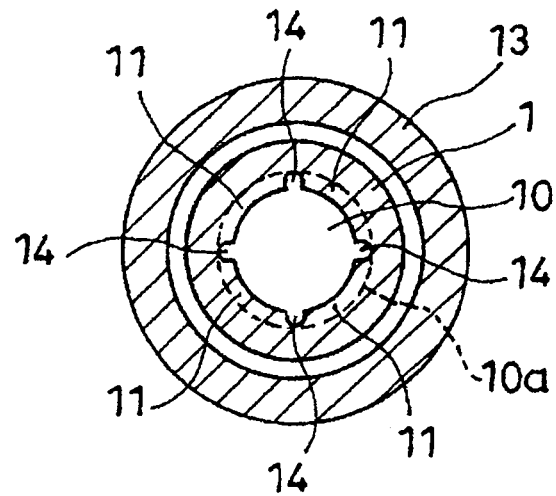
FIG. 8 is a cross sectional view of the essential parts of the other example wherein one portion of the structure of the screw grommet shown in FIGS. 1 to 6 is changed.

As shown in FIGS. 7, 8, such projecting portion 11 may be formed so as to continue in a circumferential direction thereof inside the screwing hole 10. Even in this case, the screwing groove Na of the tapping screw N to be screwed inside the head portion 1 can be reliably filled by such projecting portion 11 at any position of the helix thereof. In this case, the projecting portion 11 is not formed around the whole circumference of the screwing hole 10, and is formed by forming gaps 14 between adjacent projecting portion 11 in the circumferential direction of this screwing hole 10, and by dividing, the projecting portion 11 into two or above. At the time of the screwing of the tapping screw N, such gaps 14 can be functioned as a thickness escape, and a force required for screwing the tapping screw N can be reduced.

Also, in the illustrated example, in a cross-sectional surface perpendicular to the hole axis of the screwing hole 10, both a top portion 11a and bottom portions 11b of the projecting portion 11 are formed so as to be a curve. (FIG. 3) Concretely, in a shape of the above-mentioned cross-sectional surface, the projecting portion 11 is curved such that the top portion 11a is formed in a dome shape, and also such that both bottom portions 11b, 11b are formed such that the internal side of the screwing hole 10 is the inside of the curve. By doing this, at the time of the screwing of the tapping screw N, the projecting portion 11 is damaged by a thread of the screw. However, at this time, the projecting portion 11 can be prevented from being fractured and scraped from the inner face 10a of the screwing hole 10. Also, in an aspect without causing a problem for the screwing of the tapping screw N, a thickness amount of the projecting portion 11 can be increased.

The projecting portion 11 was projected from the inner face 10a of the screwing hole 10 such that the projecting portion 11 was entered into the inside of an imaginary circle within a range of 0.1 mm to 0.2 mm rather than a circumferential face of an imaginary cylinder which was in contact with the bottom of the root of the tapping screw N to be screwed, i.e., an arc of the imaginary circle wherein the root diameter of the tapping screw N was the diameter. Also, by setting the hole diameter of the screwing hole 10 at 5.5 mm, the tapping screw with the nominal diameter 6 specified by the JIS was screwed in. As a result, this screwing could be smoothly carried out. Meanwhile, this tapping screw and the screwing hole 10 could be reliably sealed watertight.

Incidentally, in the illustrated example, the tapping screw N is screwed by inserting the leg portion 2 into the attachment holes Pa of the fixing objects P, in a state wherein the leg portion 2. is passed through a through hole 3a of a plate-like seal material 3 which is provided with the through hole 3a for the leg portion 2 and made of rubber or plastic with rubber-like elasticity. Also, the other face 12b of the flange-like portion 12 and the fixing objects P are sealed watertight by this plate-like seal material 3.

Incidentally, all contents of the specification, claims, drawings, and abstract of Japanese Patent Application No. 2008-75268 filed on Mar. 24, 2008 are cited in their entirety herein and are incorporated as a disclosure of the specification of the present invention.

What is claimed is:
1. A screw grommet which is made of plastic, comprising:
a head portion;
a leg portion extending downwardly from the head portion and having a base portion adjacent to the head portion and a lower end side;
a circular screwing hole penetrating through the head and leg portions and having a diameter gradually reducing from the base portion toward the lower end side of the leg portion; and
a plurality of projecting portions projecting inwardly from an inner face of the circular screwing hole of the head and leg portions, wherein each of the plurality of projecting portions is formed in a rib shape extending along a hole axis of the screwing hole from the head portion to the lower end side, and a height of each of the plurality of projecting portions projecting inwardly from the inner face of the circular screwing hole in the leg portion is gradually lowered from the base portion in a direction away from the head portion to continue to the inner face of the circular screwing hole.

2. A screw grommet according to claim 1, wherein in a cross-sectional surface perpendicular to the hole axis of the screwing hole, each of the plurality of projecting portions includes a curved top portion and curved bottom portions.

3. A screw grommet according to claim 1, wherein the leg portion includes dividing grooves extending downwardly from the head portion to divide the leg portion in a plurality of sections.

4. A screw grommet according to claim 1, wherein the head portion includes the circular screwing hole extending continuously without an interruption, and the plurality of projecting portions projects from the circular screwing hole in the head portion.

5. A screw grommet according to claim 4, wherein the head portion includes a circular groove surrounding the circular screwing hole.

6. A screw grommet according to claim 1, wherein each of the plurality of projecting portions has an inner end extending linearly from the base portion to a lower end of the inner face of the circular screwing hole.

7. A combination comprising:
the screw grommet according to claim 1; and
a tapping screw screwed in the screwing hole,
wherein a hole diameter of the screwing hole is made smaller than an outer diameter of the tapping screw and larger than a root diameter of the tapping screw, and the plurality of projecting portions fills a screw groove of the tapping screw in the screwing hole so as to seal the screwing hole with the tapping screw.

8. A combination according to claim 7, wherein the head portion includes a flange portion centered on the screwing hole, and the flange portion is provided with a thickness of a size for one pitch portion or above of the tapping screw.

9. A combination according to claim 7, wherein the plurality of projecting portions enters into an inside of an imaginary circle connecting a root of the tapping screw within a range of 0.1 mm to 0.2 mm.

* * * * *